United States Patent
Kwak et al.

(10) Patent No.: US 10,135,574 B2
(45) Date of Patent: *Nov. 20, 2018

(54) SPACE-FREQUENCY BLOCK CODING AND SPATIAL MULTIPLEXING FOR WIRELESS COMMUNICATIONS

(71) Applicant: InterDigital Technology Corporation, Wilmington, DE (US)

(72) Inventors: Jaeyoung Kwak, Morganville, NJ (US); Chang-Soo Koo, Melville, NY (US); Robert L. Olesen, Huntington, NY (US); Aykut Bultan, Santa Clara, CA (US); Fatih Ozluturk, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,924

(22) Filed: Jan. 9, 2017

(65) Prior Publication Data

US 2017/0195084 A1 Jul. 6, 2017

Related U.S. Application Data

(63) Continuation of application No. 14/846,055, filed on Sep. 4, 2015, now Pat. No. 9,544,093, which is a
(Continued)

(51) Int. Cl.
*H04L 1/06* (2006.01)
*H04B 7/0413* (2017.01)
(Continued)

(52) U.S. Cl.
CPC ......... *H04L 1/0606* (2013.01); *H04B 7/0413* (2013.01); *H04B 7/0697* (2013.01); *H04L 27/2601* (2013.01)

(58) Field of Classification Search
CPC .. H04B 7/0408; H04B 7/0413; H04B 7/0697; H04L 1/04; H04L 1/0606; H04L 27/2626;
(Continued)

(56) References Cited

U.S. PATENT DOCUMENTS 5,889,759 A 3/1999 McGibney
6,298,092 B1 10/2001 Heath, Jr. et al.
(Continued)

FOREIGN PATENT DOCUMENTS

EP 1 367 760 12/2003
EP 1 372 271 12/2003
(Continued)

OTHER PUBLICATIONS

Atheros Communications et al., "Proposed HT MAC Specification," (Oct. 7, 2005).
(Continued)

*Primary Examiner* — Freshteh N Aghdam
(74) *Attorney, Agent, or Firm* — Volpe and Koenig, P.C.

(57) ABSTRACT

Channel state information (CSI) that includes a first channel quality indicator (CQI) for a first group of subcarriers and a second CQI for a second group of subcarriers may be received. For the first and second group of subcarriers, a number of streams for spatial multiplexing and modulation and coding schemes based on respective CQIs may be determined.

6 Claims, 2 Drawing Sheets

Related U.S. Application Data continuation of application No. 13/369,768, filed on Feb. 9, 2012, now Pat. No. 9,160,492, which is a continuation of application No. 11/254,358, filed on Oct. 20, 2005, now Pat. No. 8,130,855.

(60) Provisional application No. 60/627,210, filed on Nov. 12, 2004.

(51) Int. Cl.
*H04L 27/26* (2006.01)
*H04B 7/06* (2006.01)

(58) Field of Classification Search
CPC . H04L 27/2647; H04L 5/0007; H04L 1/0003; H04L 1/0009; H04L 1/0026; H04L 25/0248; H04L 27/2601
See application file for complete search history.

(56) References Cited

U.S. PATENT DOCUMENTS

| | | | |
|---|---|---|---|
| 6,473,467 | B1 | 10/2002 | Wallace et al. |
| 6,961,388 | B2 | 11/2005 | Ling et al. |
| 7,002,900 | B2 | 2/2006 | Walton et al. |
| 7,123,887 | B2 | 10/2006 | Kim et al. |
| 2003/0003863 | A1 | 1/2003 | Thielecke et al. |
| 2003/0035491 | A1 | 2/2003 | Walton et al. |
| 2003/0064690 | A1 | 4/2003 | Kasapi |
| 2003/0103584 | A1 | 6/2003 | Bjerke et al. |
| 2003/0128658 | A1 | 7/2003 | Walton et al. |
| 2003/0139194 | A1 | 7/2003 | Onggosanusi et al. |
| 2003/0218973 | A1 | 11/2003 | Oprea et al. |
| 2003/0235147 | A1 | 12/2003 | Walton et al. |
| 2003/0236080 | A1 | 12/2003 | Kadous et al. |
| 2004/0002364 | A1 | 1/2004 | Trikkonen et al. |
| 2004/0042436 | A1 | 3/2004 | Terry et al. |
| 2004/0047426 | A1 | 3/2004 | Nissani Nissensohn |
| 2004/0076124 | A1 | 4/2004 | Agrawal et al. |
| 2004/0081073 | A1 | 4/2004 | Walton et al. |
| 2004/0082356 | A1 | 4/2004 | Walton et al. |
| 2004/0114506 | A1 | 6/2004 | Chang et al. |
| 2004/0121730 | A1 | 6/2004 | Kadous et al. |
| 2004/0132496 | A1 | 7/2004 | Kim et al. |
| 2004/0185801 | A1 | 9/2004 | Pauli et al. |
| 2004/0190438 | A1 | 9/2004 | Maltsev et al. |
| 2004/0190636 | A1 | 9/2004 | Oprea et al. |
| 2004/0202257 | A1 | 10/2004 | Mehta et al. |
| 2005/0068909 | A1 | 3/2005 | Chae et al. |
| 2005/0099975 | A1 | 5/2005 | Catreux et al. |
| 2005/0243780 | A1 | 11/2005 | Trainin et al. |
| 2005/0265281 | A1 | 12/2005 | Ketchum |
| 2005/0281350 | A1* | 12/2005 | Chae ............... H04B 7/068 375/267 |
| 2006/0050770 | A1 | 3/2006 | Wallace et al. |
| 2006/0093057 | A1* | 5/2006 | Zhang ............ H04B 7/0669 375/267 |
| 2006/0104381 | A1 | 5/2006 | Menon et al. |
| 2006/0153235 | A1 | 7/2006 | Kiernan et al. |
| 2009/0129499 | A1 | 5/2009 | Kwak et al. |

FOREIGN PATENT DOCUMENTS

| | | |
|---|---|---|
| JP | 60-041831 | 3/1985 |
| JP | 11-308130 | 11/1999 |
| JP | 2002-101062 | 4/2002 |
| JP | 2002-009735 | 11/2002 |
| JP | 2003-264527 | 9/2003 |
| JP | 2004-194262 | 7/2004 |
| TW | I223516 | 11/2004 |
| WO | 01/76110 | 10/2001 |
| WO | 02/073869 | 9/2002 |
| WO | 03/041300 | 3/2003 |
| WO | 03/043245 | 5/2003 |
| WO | 04/073275 | 8/2004 |
| WO | 04/095851 | 11/2004 |
| WO | 05/066941 | 7/2005 |
| WO | 06/020741 | 2/2006 |

OTHER PUBLICATIONS

France Telecom & Orange, "Enhanced OFDM Techniques for RAN Evolution," 3GPP TSG RAN Future Evolution Work Shop, REV-WS033, Toronto, Canada (Nov. 2-3, 2004).
France Telecom & Orange, "Enhanced OFDM Techniques for RAN Evolution," 3GPP RAN Future Evolution Workshop, Jean-Philippe Javaudin (Nov. 3, 2004).
IEEE Std 802.11a-1999, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band, (Sep. 16, 1999).
IEEE Std 802.11g-2003, IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band, (Jun. 27, 2003).
IEEE Std 802.16.2-2004, IEEE Recommended Practice for Local and metropolitan area networks, Coexistence of Fixed Broadband Wireless Access Systems, (Mar. 17, 2004).
Information technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11,1999 Edition (Mar. 18, 1999).
Javaudin, "Enhanced OFDM Techniques for RAN Evolution," 3GPP RAN Future Evolution Workshop (Mar. 11, 2004).
Jung et al., "Bit and Power Allocation for MIMO-OFDM Systems with Spatial Mode Selection over Frequency-Space-Time-Selective Channels," IEEE $60^{th}$ Vehicular Technology Conference, vol. 5, pp. 3404-3408 (Sep. 2004).
Lee et al., "A Space-Frequency Transmitter Diversity Technique for OFDM Systems," IEEE Global Telecommunications Conference, vol. 3, pp. 1473-1477 (Dec. 2000).
Levy et al., "Partial MAC and PHY Proposal for 802.11n," IEEE 802.11-04/932r1 (Aug. 2004).
Levy et al., "Partial MAC and PHY Proposal," IEEE 802.11-04/933r1 (Aug. 2004). See, in particular, pp. 38-43.
Lihua et al., "SFBC-AOFDM Scheme in Fast and Frequency Selective Fading Scenarios," IEEE Symposium on Personal, Indoor, and Mobile Radio Communication Proceedings, pp. 1949-1953 (2003).
Lucent Technologies, "Increasing MIMO throughput with per-antenna rate control," 3GPP TSG RAN WG1, TSG-R1(01)0879, Turin, Italy (Aug. 2001).
Lucent Technologies, "Per Stream Rate Control with Code Reuse TxAA and APP Decoding for HSDPA," 3GPP TSG RAN WG1, TSG-R1 (02) 0570, Paris, France (Apr. 9-12, 2002).
Mahadevappa et al., "MIMO Mode Table for 802.11n," IEEE 802.11-04/553r0 (May 2004).
Motorola, "3GPP RAN Evolution: Proposal," 3GPP RAN Evolution Workshop, Toronto, Canada (Nov. 2-3, 2004).
Seki et al., "A Study of OFDM System applying Frequency Diversity," Personal, Indoor and Mobile Radio Communications, 2000, PIMRC 2000, The $11^{th}$ IEEE International Symposium on (vol. 2), pp. 1385-1389 vol. 2, (IEEE Sep. 2000).
Sohn et al., "Joint Processing of Zero-Forcing Detection and MAP Decoding for a MIMO-OFDM System," ETRI Journal, vol. 26, No. 5, pp. 384-390 (Oct. 2004).

* cited by examiner

SPACE-FREQUENCY BLOCK CODING AND SPATIAL MULTIPLEXING FOR WIRELESS COMMUNICATIONS

CROSS REFERENCE TO RELATED APPLICATIONS

This application is a continuation of U.S. patent application Ser. No. 14/846,055, filed on Sep. 4, 2015, which is a continuation of U.S. patent application Ser. No. 13/369,768, filed on Feb. 9, 2012 which issued as U.S. Pat. No. 9,160,492 on Oct. 13, 2015, which is a continuation of U.S. patent application Ser. No. 11/254,358, filed on Oct. 20, 2005 which issued as U.S. Pat. No. 8,130,855 on Mar. 6, 2012, which claims the benefit of U.S. Provisional Patent Application No. 60/627,210 filed Nov. 12, 2004, the contents of which are hereby incorporated by reference as if fully set forth.

FIELD OF INVENTION

The present invention is related to wireless communication systems. More particularly, the present invention is related to a method and apparatus for transmission diversity in such systems.

BACKGROUND

OFDM is a data transmission scheme where data is split into a plurality of smaller streams and each stream is transmitted using a sub-carrier with a smaller bandwidth than the total available transmission bandwidth. The efficiency of OFDM depends on choosing these sub-carriers orthogonal to each other. The sub-carriers do not interfere with each other while each carrying a portion of the total user data.

An OFDM system has advantages over other wireless communication systems. When the user data is split into streams carried by different sub-carriers, the effective data rate on each sub-carrier is much smaller. Therefore, the symbol duration is much larger. A large symbol duration can tolerate larger delay spreads. Thus, it is not affected by multipath as severely. Therefore, OFDM symbols can tolerate delay spreads without complicated receiver designs. However, typical wireless systems need complex channel equalization schemes to combat multipath fading.

Another advantage of OFDM is that the generation of orthogonal sub-carriers at the transmitter and receiver can be done by using inverse fast Fourier transform (IFFT) and fast Fourier transform (FFT) engines. Since the IFFT and FFT implementations are well known, OFDM can be implemented easily and does not require complicated receivers.

MIMO refers to the type of wireless transmission and reception scheme where both a transmitter and a receiver employ more than one antenna. A MIMO system takes advantage of the spatial diversity or spatial multiplexing and improves signal-to-noise ratio (SNR) and increases throughput.

SFBC is a scheme for transmitting symbols of a space diversity coding on neighboring sub-carriers rather than on the same sub-carrier in the successive time slots. The SFBC avoids the problems of fast time variations associated with space time block coding (STBC). However, the channel needs to be constant over the sub-carriers that combining takes place.

SUMMARY

The present invention is related to a method and apparatus for combining SFBC, SM and beamforming in a MIMO-OFDM system. The system includes a transmitter with a plurality of transmit antennas and a receiver with a plurality of receive antennas. The transmitter generates at least one data stream and a plurality of spatial streams. The number of generated spatial streams is based on the number of the transmit antennas and the number of the receive antennas. The transmitter determines a transmission scheme in accordance with at least one of SFBC, SM and beam forming. The transmitter transmits data in the data stream to the receiver based on the selected transmission scheme.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention will be described with reference to the drawing figures wherein like numerals represent like elements throughout.

The features of the present invention may be incorporated into an integrated circuit (IC) or be configured in a circuit comprising a multitude of interconnecting components.

The present invention provides a plurality of combinations of SFBC, SM, FD and beam selection according to the number of available data streams and spatial streams and the number of transmit and receive antennas. The combinations provide flexibility on the design of MIMO-OFDM systems and scalable solutions for any number transmit and receive antenna configuration. Each combination has trade-offs between performance, reliability and data rate. Therefore, a combination can be chosen according to some criteria, such as robustness, a data rate, a channel condition, or the like. The number of data streams is preferably decided based on a modulation and coding scheme. The number of spatial streams is decided by the number of transmit and receive antennas.

There are two modes of operation of the system: a closed loop and an open loop. The closed loop is used when channel state information (CSI) is available to the transmitter. The open loop is used when CSI is not available at the transmitter. A variant may be used for transmission to legacy STA where it provides diversity benefits.

In the closed loop mode, CSI is used to create virtually independent channels by decomposing and diagonalizing the channel matrix by precoding at the transmitter and further antenna processing at the receiver. Given the eigenvalue spread of wireless channels, a trade-off is made between a data rate and robustness by employing SFBC and/or SM. This scheme allows for a simple receiver implementation, simpler than a Minimum Mean Square Error (MMSE) receiver. The combined solution enables higher throughput over a larger range compared to traditional techniques. The technique allows per sub-carrier power/bit loading and maintains a sustained robust link through closed loop operation with CSI feedback. Another benefit of the technique is that it is easily scalable to any number of antennas at both transmitter and receiver.

The CSI can be obtained at the transmitter either by feedback from the receiver or through exploiting channel reciprocity. Latency requirements and feedback data rates are typically not significant to the inherent frequency non-selectivity of eigenvalues. A transmit antenna calibration scheme is required. In addition, channel quality information (CQI) is used to determine a coding rate and a modulation scheme per sub-carrier or group of sub-carriers. The determined coding rate and modulation scheme determines the number of data streams. According to the number of data streams, the combinations are chosen with the available spatial streams.

Figure 1:
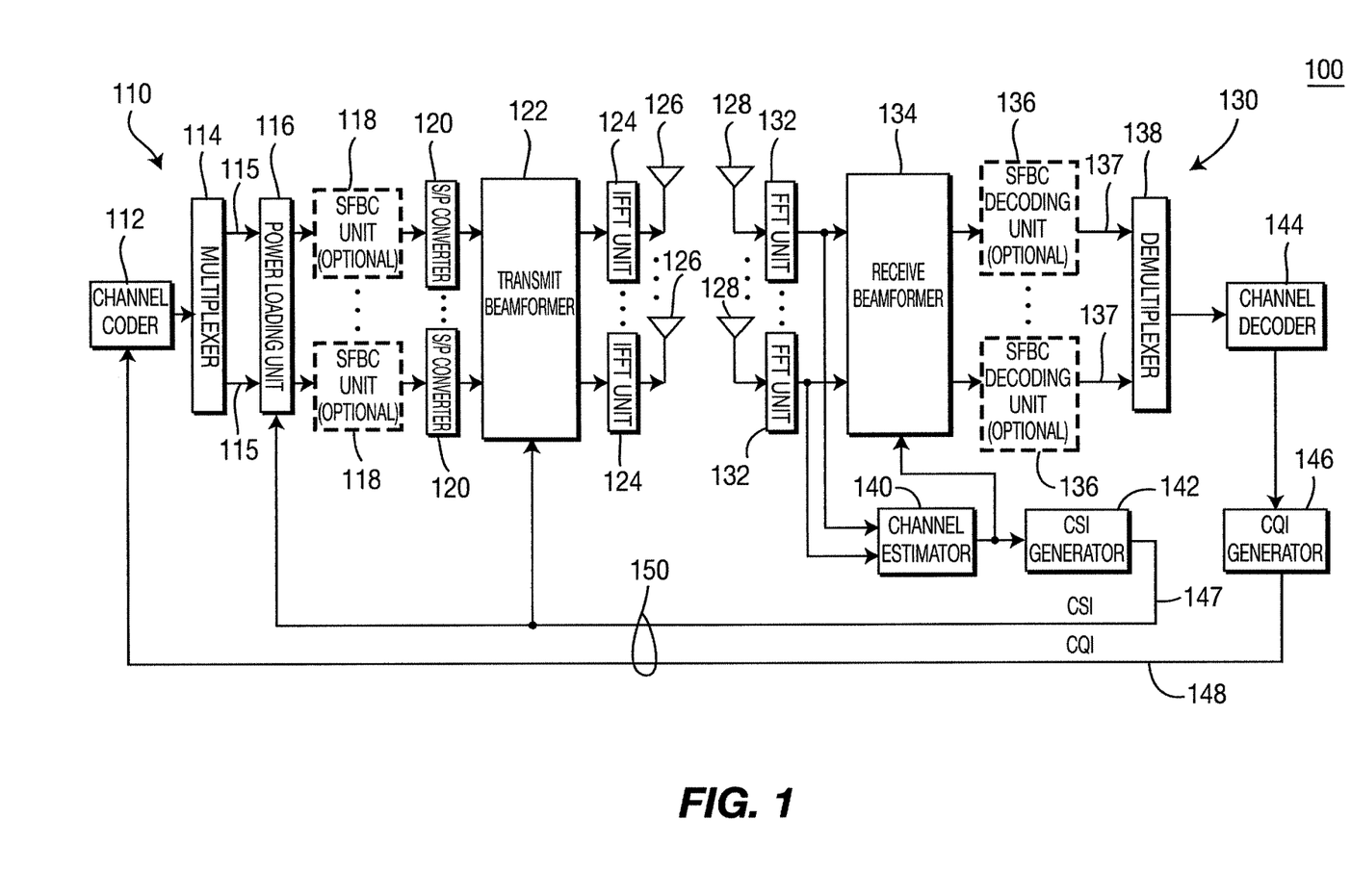
FIG. 1 is a block diagram of an OFDM-MIMO system implementing a closed loop mode in accordance with the present invention.

FIG. 1 is a block diagram of an OFDM-MIMO system 100 implementing a closed loop mode in accordance with the present invention. The system 100 includes a transmitter 110 and a receiver 130. The transmitter 110 includes a channel coder 112, a multiplexer 114, a power loading unit 116, a plurality of optional SFBC units 118, a plurality of serial-to-parallel (S/P) converters 120, a transmit beamformer 122, a plurality of IFFT units 124 and a plurality of transmit antennas 126. The channel coder 112 codes data preferably in accordance with a CQI which is provided by the receiver 130. The CQI is used to determine a coding rate and modulation scheme per sub-carrier or group of sub-carriers. The coded data stream is multiplexed by the multiplexer 114 into two or more data streams 115.

The transmit power level of each data stream 115 is adjusted by the power loading unit 116 based on feedback 150 provided from the receiver 130. The power loading unit 116 adjusts power levels with respect to the data rate of each eigenbeam to balance the total transmit power over all eigenbeams (or sub-carriers).

The optional SFBC units 118 perform SFBC on the data streams 115. SFBC is performed over eigen-beams and sub-carriers for each data rate that is transmitted. Eigen-beam and sub-carrier pairs are selected to ensure independent channels. OFDM symbols are carried on K sub-carriers. To accommodate SFBC, the sub-carriers are divided into L pairs of sub-carriers (or group of sub-carriers). The bandwidth of each group of sub-carriers should be less than the coherence bandwidth of the channel. However, when combined with eigen-beamforming this restriction is relaxed due to the frequency insensitivity of the eigen-beams.

The pairs of sub-carrier groups used by the block code are considered independent. The following is an example of the Alamouti type SFBC applied to an OFDM symbol:

$$S = \begin{bmatrix} s_1 & -s_2^* \\ s_2 & s_1^* \end{bmatrix}.$$

Once the optional SFBC units 118 construct OFDM symbols for all sub-carriers, the coded blocks are multiplexed by the S/P converters 120 and input to the transmit beamformer 122. The transmit beamformer 122 distributes eigen-beams to the transmit antennas. The IFFT units 124 convert the data in frequency domain to the data in time domain.

The receiver 130 comprises a plurality of receive antennas 128, a plurality of FFT units 132, a receive beamformer 134, a plurality of optional SFBC decoding units 136, a demultiplexer 138, a channel decoder 144, a channel estimator 140, a CSI generator 142 and a CQI generator 146.

The FFT units 132 convert samples received in time domain by the antennas 128 to frequency domain. The receive beamformer 134, the optional SFBC decoding units 136, the demultiplexer 138 and the channel decoder 144 process the samples converted to the frequency domain.

The channel estimator 140 generates channel matrix using a training sequence transmitted from the transmitter and decomposes the channel matrix into two beam-forming unitary matrices U and V, (U for transmit and V for receive), and a diagonal matrix D per sub-carrier (or per sub-carrier group) by singular value decomposition (SVD) or eigenvalue decomposition. The CSI generator 142 generates CSI 147 from the channel estimation results and the CQI generator generates a CQI 148 based on the decoding results. The CSI and the CQI provide feedback 150 from the receiver 130 to the transmitter 110.

The channel matrix H between nT transmit antennas and nR receive antennas can be written as follows:

$$H = \begin{bmatrix} h_{11} & h_{21} & \cdots & h_{1,nT} \\ h_{21} & h_{22} & \cdots & h_{2,nT} \\ & & \ddots & \vdots \\ h_{nR,1} & h_{nR,2} & \cdots & h_{nR,nT} \end{bmatrix}$$

The channel matrix H is decomposed by SVD as follows:

$$H = UDV^H,$$

where U and V are unitary matrices and D is a diagonal matrix. $U \in C^{nR \times nR}$ and $V \in C^{nT \times nT}$. Then, for transmit symbol vector s, transmit precoding is simply performed as follows:

$$x = Vs.$$

The received signal becomes as follows:

$$y = HVs + n;$$

where n is the noise introduced in the channel. The receiver completes the decomposition by using a matched filter:

$$V^H H^H = V^H V D^H U^H = D^H U^H.$$

After normalizing channel gain for eigenbeams, the estimate of the transmit symbols s becomes $$\hat{s} = \alpha D^H U^H H V s + \eta.$$
$$= s + \eta$$

The symbols s is detected without having to perform successive interference cancellation or MMSE type detector. $D^H D$ is a diagonal matrix that is formed by eigenvalues of H across the diagonal. Therefore, the normalization factor $\alpha = D^{-2}$. U are eigenvectors of $HH^H$, V are eigenvectors of $H^H H$ and D is a diagonal matrix of singular values of H (square roots of eigenvalues of $HH^H$).

If the optional SFBC units 118 and the optional SFBC decoding units 136 are removed from the transmitter 110 and the receiver 130, respectively, the transmitter 110 and the receiver 130 may be used for SM.

In the open loop mode, a combination of space-frequency coding and spatial spreading in the transmitter 110 provides diversity without requiring CSI 147. The CQI 148 is used to determine a coding rate and modulation per sub-carrier or group of sub-carriers. This coding rate and modulation scheme determines the number of data streams. According to the number of data streams, the combinations are chosen with the available spatial streams.

Figure 2:
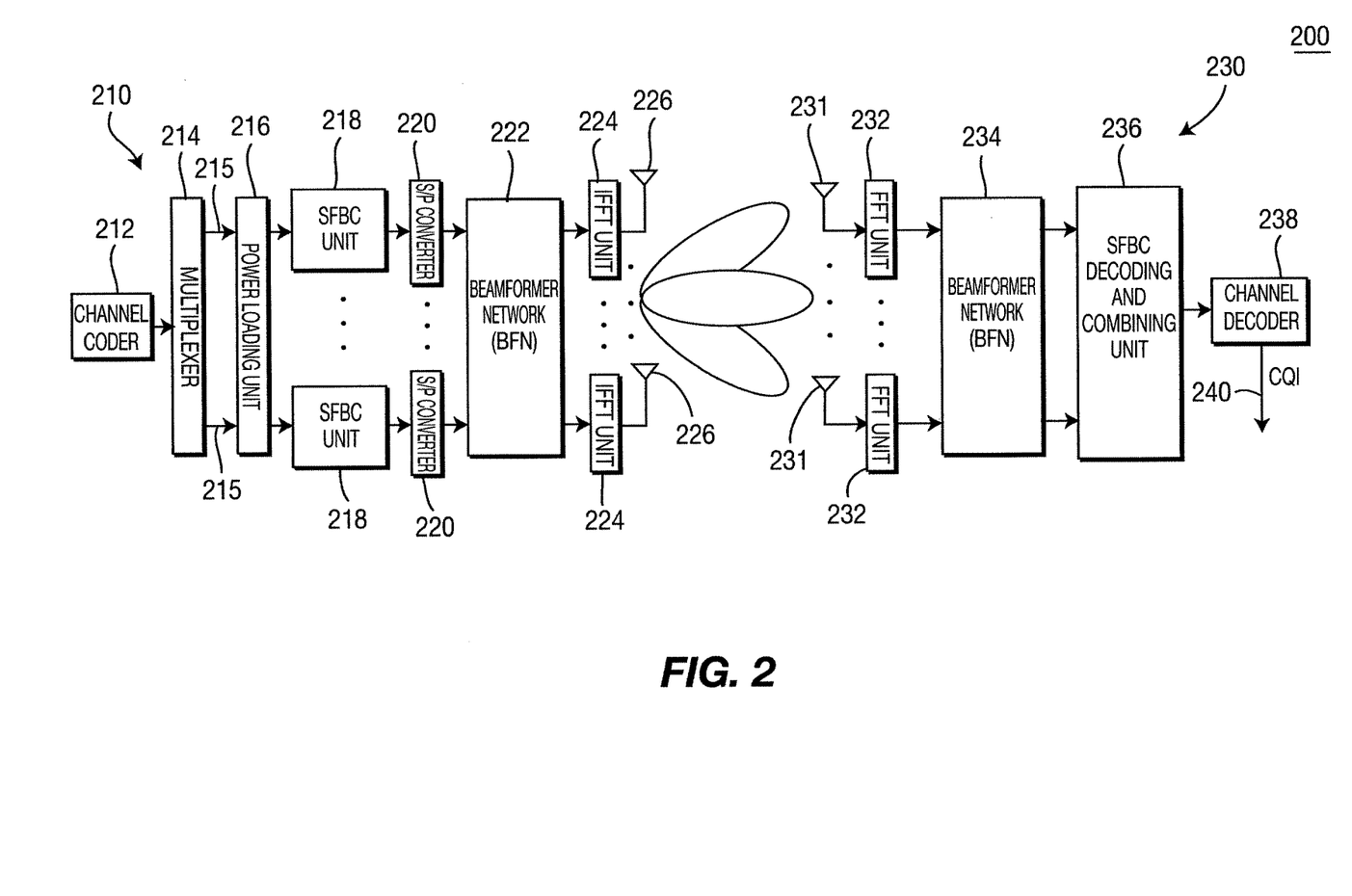
FIG. 2 is a block diagram of an OFDM-MIMO system implementing an open loop mode in accordance with the present invention.

FIG. 2 is a block diagram of a system 200 implementing an open loop mode in accordance with the present invention. The system 200 includes a transmitter 210 and a receiver 230. In the open loop mode, a combination of space-frequency coding and spatial spreading in the transmitter 210 provides diversity without requiring CSI. A variant of this scheme may be used when operating with legacy IEEE 802.11a/g user equipment.

The transmitter 210 includes a channel coder 212, a multiplexer 214, a power loading unit 216, a plurality of SFBC units 218, a plurality of serial-to-parallel (S/P) converters 220, a beamformer network (BFN) 222, a plurality of IFFT units 224 and a plurality of transmit antennas 226. As in the closed loop mode, the channel coder 212 uses CQI to determine coding rate and modulation per sub-carrier or group of sub-carriers. The coded data stream 213 is multiplexed by the multiplexer 214 into two or more data streams 215. The BFN 222 forms N beams in space, where N is the number of antennas 226. The beams are pseudo-randomly constructed by the BFN matrix operation. The independent sub-carrier groups used for the SFBC coding are transmitted on individual beams.

For legacy support, SFBC coding may not be performed. Instead diversity through beam permutation is performed which improves diversity and therefore the performance of legacy IEEE 802.11a/g user equipment.

The receiver 230 includes a plurality of receive antennas 231, FFT units 232, a BFN 234, an SFBC decoding and combining unit 236 and a channel decoder 238. The FFT units 232 convert samples received in time domain by the receive antennas 231 to frequency domain. The SFBC decoding and combining unit 236 decodes and combines symbols received from sub-carrier group s/eigen-beams and converts them from parallel to serial using a prior knowledge of the constellation size. Symbols are combined using MRC. The channel decoder 238 decodes the combined symbol and generates a CQI 240.

If the SFBC units 218 and the SFBC decoding function of the SBC decoding and combining unit 236 are removed from the transmitter 210 and the receiver 230, respectively, the transmitter 210 and the receiver 230 may be used for SM.

Examples of SFBC, SM, FD and beam selection combinations in accordance with the present invention are explained hereinafter.

$S_i$ denotes the group of the modulated symbols. The length depends on how many groups the sub-carriers for data are divided into. Sub-carriers are divided into two groups. Each $S_i$ includes symbols whose length is a half of the number of sub-carriers for data.

$d_n$, denotes singular values of the channel matrix, where $d_1 > d_2 > d_3 > \ldots > d_M$, M is the maximum number of the singular values, (i.e., the number of transmit antennas).

Rate=1 means that M symbols are sent and recovered per one sub-carrier during one OFDM symbol duration. When less than M symbols are sent and recovered, the rate is fractional.

In FD, $S_i$ is sent on a half of sub-carriers and $S_i^*$ is sent on the other half of sub-carriers.

Single transmit antenna case—Single-input single-output (SISO).

In a SISO case, only one data stream and one spatial stream are implemented. Without using FD, one symbol is sent per sub-carrier. Using FD, one symbol is sent per two sub-carriers. It is summarized in Table 1.

TABLE 1

| Spatial Streams | SISO (Without FD) | SISO (With FD) |
|---|---|---|
| Stream 1 | S1, S2 | S1, S1* |
| Rate | 1 | ½ |

Two transmit antenna case.

With two transmit antennas, a 2×1 or a 2×2 MIMO-OFDM system may be supported, and either one or two data streams may be supported.

2×1 MIMO-OFDM closed loop—one data stream case.

In a closed loop mode, beam selection with or without FD and SFBC may be used. Since data transmitted on the beam having smaller singular value will die, one beam is selected through SVD. The SVD beam having a larger singular value is chosen. For a beam selection without FD, one data symbol is sent per a sub-carrier and for a beam selection with FD, one data symbol is sent per two sub-carriers. In a beam selection with FD, the rate is a half of that in the beam selection without FD case, but the reliability is increased.

Although the data transmitted on the beam having smaller singular value will die, two symbols can be sent at the same time by using SFBC through two sub-carriers. Using this scheme, one data symbol is sent per sub-carrier. Comparing with the beam selection case, the performance of this case will be degraded, since the second stream with the smaller singular value includes only noise.

One data stream case for the 2×1 MIMO-OFDM closed loop is summarized in Table 2.

TABLE 2

| Spatial Streams | Beam Selection (Without FD) | Beam Selection (With FD) | SFBC |
|---|---|---|---|
| Stream 1 (d1) | S1, S2 | S1, S1* | S1, −S2* |
| Stream 2 (d2 = 0) | | | S2, S1* |
| Rate | ½ | 1/4 | ½ |

2×1 MIMO-OFDM open loop—one data stream case.

In an open loop mode, SM with or without FD and SFBC may be used. For SM (with the fixed beamforming matrix) without FD, one data symbol is sent per sub-carrier for each spatial stream by using the fixed beamforming and SM, and for SM with FD, one data symbol is sent per two sub-carriers for each spatial stream by using the fixed beamforming and SM.

Combination of FD and non-FD is possible. In such case, one symbol is sent on two sub-carriers on one spatial stream and one symbol is sent on one sub-carrier on the other spatial stream. The data rate is ¾ of the SM without FD case.

If SFBC with the fixed beamforming matrix is used, two data symbols of the data stream are sent on two sub-carriers through two antennas by using the fixed beamforming. The data rate is a half of the SM without-FD case.

One data stream case for the 2×1 MIMO-OFDM open loop is summarized in Table 3.

TABLE 3

| Spatial Streams | SM (Without FD) | SM (With FD) | SM (FD + non-FD) | SFBC |
|---|---|---|---|---|
| Stream 1 | S1, S2 | S1, S1* | S1, S1* | S1, −S2* |
| Stream 2 | S3, S4 | S2, S2* | S2, S3 | S2, S1* |
| Rate | 1 | ½ | ¾ | 1/2 |

2×1 MIMO-OFDM (open loop)—two data stream case.

For two data stream case, an open loop mode should be used since an SVD beam having a smaller singular value carries nothing but noise and will die, as explained hereinbefore. Without FD, one data symbol is sent per sub-carrier for each spatial stream and with FD, one data symbol is sent per two sub-carriers for each spatial stream. Combination of FD and non-FD is possible.

Two data stream case for the 2×1 MIMO-OFDM open loop is summarized in Table 4.

TABLE 4

| Spatial Streams | SM (Without FD) | SM (FD + non-FD) | SM (With FD) |
|---|---|---|---|
| Stream 1 | S1, S2 | S1, S1* | S1, S1* |
| Stream 2 | S3, S4 | S2, S3 | S2, S2* |
| Rate | 1 | ¾ | ½ |

2×2 MIMO-OFDM closed loop—one data stream case.

In a closed loop mode, SM with or without FD, beam selection with or without FD and SFBC may be used. In a closed loop mode, two spatial beams are formed by SVD for each sub-carrier.

For SM without FD, one data symbol is sent per one sub-carrier for each spatial stream and for SM with FD, one data symbol is sent per two sub-carriers by using one spatial stream. Combination of FD and non-FD is possible.

For beam selection, one SVD beam between two beams for each sub-carrier is selected, which has larger singular value, and the other beam of each sub-carrier is discarded. For beam selection without FD, one data symbol is sent per one sub-carrier by using one spatial stream. For beam selection with FD, one data symbol is sent per two sub-carriers by using one spatial stream.

Two spatial streams for each sub-carrier are generated according to the SVD of the channel of each sub-carrier and two data symbols can be sent on two sub-carriers by using SFBC.

One data stream case for the 2×2 MIMO-OFDM closed loop is summarized in Table 5.

TABLE 5

| Spatial Streams | SM + SVD (Without FD) | SM + SVD (With FD) | SM + SVD (FD + non-FD) | Beam Selection (Without FD) | Beam Selection (With FD) | SFBC |
|---|---|---|---|---|---|---|
| Stream 1 (d1) | S1, S2 | S1, S1* | S1, S2 | S1, S2 | S1, S1* | S1, −S2* |
| Stream 2 (d2) | S3, S4 | S2, S2* | S3, S3* | | | S2, S1* |
| Rate | 1 | 1/2 | 3/4 | 1/2 | ¼ | ½ |

2×2 MIMO-OFDM open loop—one data stream case.

In an open loop, SM with or without FD and SFBC may be supported. SM is implemented with a fixed beamforming matrix and both spatial streams of each sub-carrier may be used.

For SM without FD, one data symbol is sent per one sub-carrier for each spatial stream and for SM with FD, one data symbol is sent per two sub-carriers by using one spatial stream. Combination of FD and non-FD is possible.

Two data symbols of the data stream can be sent on two sub-carriers for each spatial stream by using the fixed beamforming and SFBC.

The transmitting method is same as one for the 2×1 system. However, the performance will be better, since two receive antennas are used in a receiver.

One data stream case for the 2×2 MIMO-OFDM open loop is summarized in Table 6.

TABLE 6

| Spatial Streams | SM (Without FD) | SM (With FD) | SM (FD + non-FD) | SFBC |
|---|---|---|---|---|
| Stream 1 | S1, S2 | S1, S1* | S1, S2 | S1, −S2* |
| Stream 2 | S3, S4 | S2, S2* | S3, S3* | S2, S1* |
| Rate | 1 | ½ | 3/4 | 1/2 |

2×2 MIMO-OFDM closed loop—two data stream case.

In a closed loop mode, SM with or without FD may be used. SM is performed with SVD beamforming and two spatial streams are available for each sub-carrier. Since there are two data streams, one spatial stream should be assigned to each data stream, and SFBC is not possible for the same reason.

For SM without FD, one data symbol is sent per one sub-carrier for each spatial stream and for SM with FD, one data symbol is sent per two sub-carriers by using one spatial stream. Combination of FD and non-FD is possible.

Two data stream case for the 2×2 MIMO-OFDM closed loop is summarized in Table 7.

TABLE 7

| Spatial Streams | SM + SVD (Without FD) | SM + SVD (With FD) | SM (FD + non-FD) |
|---|---|---|---|
| Stream 1 (d1) | S1, S2 | S1, S1* | S1, S2 |
| Stream 2 (d2) | S3, S4 | S2, S2* | S3, S3* |
| Rate | 1 | 1/2 | ¾ |

2×2 MIMO-OFDM open loop—two data stream case.

In an open loop, SM is implemented with the fixed beamforming matrix and two spatial streams are available for each sub-carrier. As explained hereinbefore, one spatial stream is assigned to each data stream.

For SM without FD, one data symbol is sent per one sub-carrier for each spatial stream and for SM with FD, one data symbol is sent per two sub-carriers by using one spatial stream. Combination of FD and non-FD is possible.

Two data stream case for the 2×2 MIMO-OFDM open loop is summarized in Table 8.

TABLE 8

| Spatial Streams | SM (Without FD) | Sm (With FD) | Sm (FD + non-FD) |
|---|---|---|---|
| Stream 1 | S1, S2 | S1, S1* | S1, S1* |
| Stream 2 | S3, S4 | S2, S2* | S2, S3 |
| Rate | 1 | 1/2 | ¾ |

Three transmit antenna case.

With three transmit antennas, 3×1, 3×2 and 3×3 MIMO-OFDM systems may be supported, and either one, two or three data streams may be supported.

3×1 MIMO-OFDM closed loop—one data stream case.

In a closed loop mode, beam selection with or without FD and SFBC may be used. Beams are generated with SVD beam forming, and for beam selection, one spatial beam is selected (only one beam is available since two other beams do not carry nothing but noise and will die). The beam having the largest singular value is selected.

For beam selection without FD, one data symbol is sent per one sub-carrier for the chosen spatial stream and for beam selection with FD, one data symbol is sent per two sub-carriers for the chosen spatial stream.

For SFBC with SVD beamforming, two spatial streams are selected for each sub-carrier: one corresponding to the largest singular value and the other one corresponding to one of the rest. However, even though two symbols can be sent at the same time by using SFBC through two sub-carriers, the performance will be very low, since one spatial stream includes only noise.

3×1 MIMO-OFDM open loop—one data stream case.

In an open loop case, SM and SFBC are implemented with the fixed beamforming matrix and three spatial streams are available.

For SM without FD, one data symbol is sent per one sub-carrier for each spatial stream and for SM with FD, one data symbol is sent per two sub-carriers for each spatial stream. Combination of FD and non-FD is possible. One data symbol is sent per two sub-carriers on one spatial stream and one symbol is sent per one sub-carrier on two other spatial streams, or one data symbol is sent per two sub-carriers on two spatial streams and one symbol is sent per one sub-carrier on the other spatial stream.

SFBC may be implemented with or without FD. Among three spatial streams for each sub-carrier, two spatial streams are used for SFBC and the other one is used for independent data symbol. Therefore, three symbols can be sent for each sub-carrier at each instant.

One data stream case for the 3×1 MIMO-OFDM open loop is summarized in Table 10.

TABLE 10

| Spatial Streams | SM (Without FD) | SM (With FD) | SM (FD + non-FD) (case 1) | SM (FD + non-FD) (case 2) | SFBC + Without FD | SFBC + With FD |
|---|---|---|---|---|---|---|
| Stream 1 | S1, S2 | S1, S1* | S1, S2 | S1, S2 | S1, −S2* | S1, −S2* |
| Stream 2 | S3, S4 | S2, S2* | S3, S3* | S3, S4 | S2, S1* | S2, S1* |
| Stream 3 | S5, S6 | S3, S3* | S4, S4* | S5, S5* | S3, S4 | S3, S3* |
| Rate | 1 | 1/2 | 2/3 | 5/6 | 2/3 | 1/2 |

One data stream case for the 3×1 MIMO-OFDM closed loop is summarized in Table 9.

TABLE 9

| Spatial Streams | Beam Selection (Without FD) | Beam Selection (With FD) | SFBC |
|---|---|---|---|
| Stream 1 (d1) | S1, S2 | S1, S1* | S1, −S2* |
| Stream 2 (d2 = 0) | | | S2, S1* |
| Stream 3 (d3 = 0) | | | |
| Rate | 1/3 | 1/6 | 1/3 |

3×1 MIMO-OFDM (open loop)—two data stream case.

In this case, an open loop structure should be used to send and recover two data streams. SM and SFBC are implemented with the fixed beamforming matrix and two data streams are divided into three spatial streams for each sub-carrier.

For SM without FD, one data symbol is sent per one sub-carrier for each spatial stream and for SM with FD, one data symbol is sent per two sub-carriers for each spatial stream. Combination of FD and non-FD is possible.

With SFBC, one data stream is sent and recovered by using SFBC and the other data stream does not use SFBC. Among three spatial streams for each sub-carrier, two spatial streams are used for SFBC and the other one is for the other data stream.

Two data stream case for the 3×1 MIMO-OFDM open loop is summarized in Table 11.

TABLE 11

| Spatial Streams | SM (Without FD) | SM (With FD) | SM (FD + non-FD) (case 1) | SM (FD + non-FD) (case 2) | SFBC + Without FD | SFBC + With FD |
|---|---|---|---|---|---|---|
| Stream 1 | S1, S2 | S1, S1* | S1, S2 | S1, S2 | S1, −S2* | S1, −S2* |
| Stream 2 | S3, S4 | S2, S2* | S3, S3* | S3, S4 | S2, S1* | S2, S1* |
| Stream 3 | S5, S6 | S3, S3* | S4, S4* | S5, S5* | S3, S4 | S3, S3* |
| Rate | 1 | 1/2 | 2/3 | 5/6 | 2/3 | 1/2 |

3×1 MIMO-OFDM (open loop)—three data stream case.

In this case, an open loop structure should be used to send and recover three data streams. SM and SFBC are implemented with the fixed beamforming matrix and three data streams are divided into three spatial streams for each sub-carrier and SFBC is not possible in this case.

For SM without FD, one data symbol is sent per one sub-carrier for each spatial stream and for SM with FD, one data symbol is sent per two sub-carriers for each spatial stream. Combinations of FD and non-FD are possible.

Three data stream case for the 3×1 MIMO-OFDM open loop is summarized in Table 12.

TABLE 12

| Spatial Stream | SM (Without FD) | SM (With FD) | SM (FD + non-FD (case 1) | SM (FD + non-FD (case 2) |
|---|---|---|---|---|
| Stream 1 | S1, S2 | S1, S1* | S1, S2 | S1, S2 |
| Stream 2 | S3, S4 | S2, S2* | S3, S3* | S3, S4 |
| Stream | S5, S6 | S3, S3* | S4, S4* | S5, S5* |
| Rate | 1 | ½ | 2/3 | 5/6 |

3×2 MIMO-OFDM closed loop—one data stream case.

Two spatial streams are available for this case. Two beams are selected among three beams for each sub-carrier generated through SVD. Two SVD beams having larger singular values are selected.

For SM without FD, one data symbol is sent per one sub-carrier for each spatial stream and for SM with FD, one data symbol is sent per two sub-carriers for each spatial stream. A combination of FD and non-FD is possible.

For SFBC, two spatial streams for each sub-carrier are selected and two symbols are sent at the same time by using SFBC through two sub-carriers. Using this scheme, two data symbol can be recovered per two sub-carriers.

One data stream case for the 3×2 MIMO-OFDM closed loop is summarized in Table 13.

TABLE 13

| Spatial Streams | SM (Without FD) | SM (With FD) | SM (FD + non-FD) | SFBC |
|---|---|---|---|---|
| Stream 1 (d1) | S1, S2 | S1, S1* | S1, S2 | S1, −S2* |
| Stream 2 (d2) | S3, S4 | S2, S2* | S3, S3* | S2, S1* |
| Stream 3 (d3 = 0) | | | | |
| Rate | 2/3 | 1/3 | 1/2 | 1/3 |

3×2 MIMO-OFDM open loop—one data stream case.

The 3×2 open loop case for one data stream is same to the 3×1 open loop case for one data stream.

3×2 MIMO-OFDM closed loop—two data stream case.

Two spatial streams are available for this case. Two beams among three beams for each sub-carrier generated through SVD are selected. Two SVD beams having larger singular values are selected.

For SM without FD, one data symbol is sent per one sub-carrier for each spatial stream and for SM with FD, one data symbol is sent per two sub-carriers for each spatial stream. A combination of FD and non-FD is possible.

Two data stream case for the 3×2 MIMO-OFDM closed loop is summarized in Table 14.

TABLE 14

| Spatial Streams | SM (Without FD) | SM (with FD) | SM (FD + non-FD) |
|---|---|---|---|
| Stream 1 (d1) | S1, S2 | S1, S1* | S1, S2 |
| Stream 2 (d2) | S3, S4 | S2, S2* | S3, S3* |
| Stream 3 (d3 = 0) | | | |
| Rate | 2/3 | 1/3 | 1/2 |

3×2 MIMO-OFDM open loop—two data stream case.

The 3×2 open loop case for two data streams is same to the 3×1 open loop case for two data streams.

3×2 MIMO-OFDM—three data stream case.

A 3×2 MIMO-OFDM system for three data streams is same to the 3×1 MIMO-OFDM system for three data streams.

3×3 MIMO-OFDM closed loop—one data stream case.

In a closed loop case, three spatial streams are available. For SM without FD, one data symbol is sent per one sub-carrier for each spatial stream, and for SM with FD, one data symbol is sent per two sub-carriers for each spatial stream. Combinations of FD and non-FD are possible.

For SFBC, two spatial streams among three spatial streams are selected. Preferably, two bad spatial streams for each sub-carrier are selected, which have smaller singular values. Two symbols are sent at the same time by using SFBC on the two bad spatial streams of two sub-carriers. For the other good stream for each carrier, one data symbol is sent without SFBC.

For the non-SFBC spatial stream, if FD is used, one data symbol is sent per one sub-carrier for this spatial stream and if FD is not used, one data symbol is sent per two sub-carriers for this spatial stream.

One data stream case for the 3×3 MIMO-OFDM closed loop is summarized in Table 15.

TABLE 15

| Spatial Streams | SM (Without FD) | SM (With FD) | SM (FD + non-FD (case 1) | SM (FD + non-FD (case 2) | SFBC + Without FD | SFBC + With FD |
|---|---|---|---|---|---|---|
| Stream 1 (d1) | S1, S2 | S1, S1* | S1, S2 | S1, S2 | S1, S2 | S1, S1* |
| Stream 2 (d2) | S3, S4 | S2, S2* | S3, S3* | S3, S4 | S3, −S4* | S2, −S3* |
| Stream 3 (d3) | S5, S6 | S3, S3* | S4, S4* | S5, S5* | S4, S3* | S3, S2* |
| Rate | 1 | 1/2 | 2/3 | 5/6 | 2/3 | 1/2 |

3×3 MIMO-OFDM open loop—one data stream case.

In an open loop case, all the options for 3×1 open loop case for one data stream may be used.

3×3 MIMO-OFDM closed loop—two data stream case.

Three spatial streams are available for this case and two data streams are divided into three spatial streams for each sub-carrier. In a closed loop, for SM without FD, one data symbol is sent per one sub-carrier for each spatial stream, and for SM with FD, one data symbol is sent per two sub-carriers for each spatial stream. Combinations of FD and non-FD are possible.

For SFBC, two spatial streams are selected among three spatial streams. Preferably, two bad spatial streams for each sub-carrier are selected, which have smaller singular values. For one data stream, two symbols are sent at the same time by using SFBC on two bad spatial streams of two sub-carriers, and for the other good stream for each carrier, the other data stream is sent without SFBC.

For the non-SFBC spatial stream, without FD, one data symbol is sent per one sub-carrier for this spatial stream, and with FD, one data symbol is sent per two sub-carriers for this spatial stream.

Two data stream case for the 3×3 MIMO-OFDM closed loop is summarized in Table 16.

TABLE 16

| Spatial Streams | SM (Without FD) | SM (With FD) | SM (FD + non-FD (case 1) | SM (FD + non-FD (case 2) | SFBC + Without FD | SFBC + With FD |
|---|---|---|---|---|---|---|
| Stream 1 (d1) | S1, S2 | S1, S1* | S1, S2 | S1, S2 | S1, S2 | S1, S1* |
| Stream 2 (d2) | S3, S4 | S2, S2* | S3, S3* | S3, S4 | S3, −S4* | S2, −S3* |
| Stream 3 (d3) | S5, S6 | S3, S3* | S4, S4* | S5, S5* | S4, S3* | S3, S2* |
| Rate | 1 | 1/2 | 2/3 | 5/6 | 2/3 | 1/2 |

3×3 MIMO-OFDM open loop—two data stream case.

In an open loop case, all the options for 3×1 open loop case for two data streams may be used.

3×3 MIMO-OFDM closed loop—three data stream case.

Three spatial streams are available for this case and three data streams are divided into three spatial streams for each sub-carrier. In a closed loop, for SM without FD, one data symbol is sent per one sub-carrier for each spatial stream and for SM with FD, one data symbol is sent per two sub-carriers for each spatial stream. Combinations of FD and non-FD are possible.

Two data stream case for the 3×3 MIMO-OFDM closed loop is summarized in Table 17.

TABLE 17

| Spatial Streams | SM (Without FD) | SM (With FD) | SM (FD + non-FD 1) | SM (FD + non-FD 2) |
|---|---|---|---|---|
| Stream 1 (d1) | S1, S2 | S1, S1* | S1, S2 | S1, S2 |
| Stream 2 (d2) | S3, S4 | S2, S2* | S3, S3* | S3, S4 |
| Stream 3 (d3) | S5, S6 | S3, S3* | S4, S4* | S5, S5* |
| Rate | 1 | 1/2 | 2/3 | 5/6 |

3×3 MIMO-OFDM closed loop—three data stream case.

In an open loop case, all the options for 3×1 open loop case for three data streams may be used.

Four transmit antenna case.

With four transmit antennas, 4×1, 4×2, 4×3 and 4×4 MIMO-OFDM systems may be supported, and either one, two, three or four data streams may be supported.

4×1 MIMO-OFDM closed loop—one data stream case.

Only one spatial stream is available for this case. In a closed loop case, one beam among four beams for each sub-carrier generated through SVD is selected. The SVD beam having the largest singular value is selected.

For SM without FD, one data symbol is sent per one sub-carrier for the spatial stream and for SM with FD, one data symbol is sent per two sub-carriers for the spatial stream.

For SFBC with SVD beamforming, two spatial streams for each sub-carrier are selected among four beams generated through SVD. One corresponds to the largest singular value and the other corresponds to one of the rest. Although two symbols can be sent at the same time by using SFBC through two sub-carriers, the performance will be low, since the bad spatial stream includes only noise.

One data stream case for the 4×1 MIMO-OFDM closed loop is summarized in Table 18.

TABLE 18

| Spatial Stream | SM (Without FD) | SM (With FD) | SFBC |
|---|---|---|---|
| Stream 1 (d1 = 0) | S1, S2 | S1, S1* | S1, −S2* |
| Stream 2 (d2 = 0) | | | S2, S1* |
| Stream 3 (d3 = 0) | | | |
| Stream 4 (d4 = 0) | | | |
| Rate | ¼ | 1/8 | ¼ |

4×1 MIMO-OFDM open loop—one data stream case.

SM is implemented with the fixed beamforming matrix and four spatial streams are available.

For SM without FD, one data symbol is sent per one sub-carrier for the spatial stream and for SM with FD, one data symbol is sent per two sub-carriers for the spatial stream. Combinations of FD and non-FD are possible as shown in Table 19 below. For one data stream, these combinations may not be used to maintain same quality for all data symbols.

Combination of SM and SFBC with the fixed beamforming matrix are possible. A first option is one 2×2 SFBC and two SM. For one data stream, this option may not used to maintain same quality for all data symbols. The other two spatial streams of each sub-carrier are used for SM of another two data symbols of the data stream. Without FD, one data symbol is sent per one sub-carrier for each spatial stream and with FD, one data symbol is sent per two sub-carriers for each spatial stream. Combinations of FD and non-FD are possible as shown in Table 20.

A second option is using two 2×2 SFBC. Four spatial streams of each sub-carrier are divided into two groups of two streams and each group is assigned to each SFBC. For each instant, four (4) data symbols are sent on two sub-carriers by using the fixed beamforming and two 2×2 SFBCs.

TABLE 19

| Spatial Streams | SM (Without FD) | SM (With FD) | SM (FD + non-FD 1) | SM (FD + non-FD 2) | SM (FD + non-FD 3) |
|---|---|---|---|---|---|
| Stream 1 | S1, S2 | S1, S1* | S1, S2 | S1, S2 | S1, S2 |
| Stream 2 | S3, S4 | S2, S2* | S3, S3* | S3, S4 | S3, S4 |
| Stream 3 | S5, S6 | S3, S3* | S4, S4* | S5, S5* | S5, S6 |
| Stream 4 | S7, S8 | S4, S4* | S5, S5* | S6, S6* | S7, S7* |
| Rate | 1 | 1/2 | 5/8 | 3/4 | 7/8 |

TABLE 20

| Spatial Streams | SFBC (Without FD) | SFBC (With FD) | SFBC (FD + non-FD) | Two SFBC |
|---|---|---|---|---|
| Stream 1 | S2 | S1, S1* | S1, S2 | S1, −S2* |
| Stream 2 | S3, S4 | S2, S2* | S3, S3* | S2, S1* |
| Stream 3 | S5, −S6* | S3, −S4* | S4, −S5* | S3, −S4* |
| Stream 4 | S6, S5* | S4, S3* | S5, S4* | S4, S3* |
| Rate | 3/4 | ½ | 5/8 | 1/2 |

4×1 MIMO-OFDM (open loop)—two data stream case.

In this case, an open loop should be used to send and recover the two data streams. SM is implemented with the fixed beamforming matrix and two data streams are divided into four spatial streams for each sub-carrier.

For SM without FD, one data symbol is sent per one sub-carrier for the spatial stream and for SM with FD, one data symbol is sent per two sub-carriers for the spatial stream. Combinations of FD and non-FD are possible as shown in Table 21. The combination cases 1 and 3 in Table 21 may not used to maintain the same quality for each data symbol of each data stream.

Combination of SM and SFBC with the fixed beamforming matrix is possible. A first option is one 2×2 SFBC and two SM. One data stream is assigned to the SFBC and the other data stream is sent by SM. Two spatial streams of each sub-carrier are used for SFBC and the other two spatial streams of each sub-carrier are used for SM. Without FD, one data symbol is sent per one sub-carrier for each spatial stream, and with FD, one data symbol is sent per two sub-carriers for each spatial stream. A combination of FD and non-FD is possible as shown in Table 22. This combination may not used to maintain the same quality for each data symbol of the data stream, which uses SM.

A second option is using two 2×2 SFBCs. Each data stream is assigned to the separate 2×2 SFBC. Four spatial streams of each sub-carrier are divided into two groups of two streams and each group is assigned to each SFBC. For each instant, 2 data symbols of each data stream are sent on two sub-carriers by using the fixed beamforming and each 2×2 SFBCs.

TABLE 21

| Spatial Streams | SM (Without FD) | SM (With FD) | SM (FD + non-FD 1) | SM (FD + non-FD 2) | SM (FD + non-FD 3) |
|---|---|---|---|---|---|
| Stream 1 | S1, S2 | S1, S1* | S1, S2 | S1, S2 | S1, S2 |
| Stream 2 | S3, S4 | S2, S2* | S3, S3* | S3, S4 | S3, S4 |
| Stream 3 | S5, S6 | S3, S3* | S4, S4* | S5, S5* | S5, S6 |

TABLE 21-continued

| Spatial Streams | SM (Without FD) | SM (With FD) | SM (FD + non-FD 1) | SM (FD + non-FD 2) | SM (FD + non-FD 3) |
|---|---|---|---|---|---|
| Stream 4 | S7, S8 | S4, S4* | S5, S5* | S6, S6* | S7, S7* |
| Rate | 1 | 1/2 | 5/8 | 3/4 | 7/8 |

TABLE 22

| Spatial Streams | SFBC (Without FD) | SFBC (With FD) | SFBC (FD + non-FD) | Two SFBC |
|---|---|---|---|---|
| Stream 1 | S1, S2 | S1, S1* | S1, S2 | S1, −S2* |
| Stream 2 | S3, S4 | S2, S2* | S3, S3* | S2, S1* |
| Stream 3 | S5, −S6* | S3, −S4* | S4, −S5* | S3, −S4* |
| Stream 4 | S6, S5* | S4, S3* | S5, S4* | S4, S3* |
| Rate | 3/4 | ½ | 5/8 | 1/2 |

4×1 MIMO-OFDM (open loop)—three data stream case.

In this case, an open loop should be used to send and recover three data streams. SM is implemented with the fixed beamforming matrix and three data streams are divided into four data symbols for each sub-carrier. All the combinations in Table 21 can be used.

Combination of SM and SFBC with the fixed beamforming matrix is possible. A first option is using one 2×2 SFBC and two SMs. Two spatial streams of each sub-carrier are used for SFBC. One data stream is sent using this SFBC and the fixed beamforming and the other two spatial streams of each sub-carrier are used for SM of the other two data streams. Without FD, one data symbol is sent per one sub-carrier for each spatial stream, and with FD, one data symbol is sent per two sub-carriers for each spatial stream. A combination of FD and non-FD is possible as shown in Table 23.

Three data stream case for the 4×1 MIMO-OFDM open loop for SFBC is summarized in Table 23.

TABLE 23

| Spatial Streams | SFBC (Without FD) | SFBC (With FD) | SFBC (FD + non-FD) |
|---|---|---|---|
| Stream 1 | S1, S2 | S1, S1* | S1, S2 |
| Stream 2 | S3, S4 | S2, S2* | S3, S3* |
| Stream 3 | S5, −S6* | S3, −S4* | S4, −S5* |
| Stream 4 | S6, S5* | S4, S3* | S5, S4* |
| Rate | 3/4 | 1/2 | 5/8 |

4×1 MIMO-OFDM (open loop)—four data stream case.

In this case an open loop should be used to send and recover four data streams. SM is implemented with the fixed beamforming matrix and four data streams are divided into four spatial streams for each sub-carrier. All the methods in Table 21 can be used.

4×2 MIMO-OFDM closed loop—one data stream case.

Only two spatial streams are available for this case. Two beams are selected among four beams for each sub-carrier generated through SVD. Two SVD beams having larger singular values are selected. For SM without FD, one data symbol is sent per one sub-carrier for the spatial stream and for SM with FD, one data symbol is sent per two sub-carriers for the spatial stream. Combinations of FD and non-FD are possible as shown in Table 24.

For SFBC, two spatial streams for each sub-carrier are selected, which have larger singular values. Two symbols are sent at the same time by using SFBC through two sub-carriers. Using this scheme, two data symbol are recovered per two sub-carriers at each instant.

One data stream case for the 4×2 MIMO-OFDM closed loop is summarized in Table 24.

TABLE 24

| Spatial Streams | SM (Without FD) | SM (With FD) | SM (FD + non-FD) | SFBC |
|---|---|---|---|---|
| Stream 1 (d1) | S1, S2 | S1, S1* | S1, S2 | S1, −S2* |
| StreaM 2 (d2) | S3, S4 | S2, S2* | S3, S3* | S2, S1* |
| Stream 3 (d3 = 0) | | | | |
| Stream 4 (d4 = 0) | | | | |
| Rate | 1/2 | 1/4 | 3/8 | 1/4 |

4×2 MIMO-OFDM open loop—one data stream case.

In this case, all the options for 4×1 open loop case for one data stream may be used.

4×2 MIMO-OFDM closed loop—two data stream case.

Two spatial streams are available for this case. Two beams are selected among four beams for each sub-carrier generated through SVD. Two SVD beams having larger singular values are selected. Without FD, one data symbol is sent per one sub-carrier for each spatial stream, and with FD, one data symbol is sent per two sub-carriers for each spatial stream. A combination of FD and non-FD is possible.

Two data stream case for the 4×2 MIMO-OFDM closed loop is summarized in Table 25.

TABLE 25

| Spatial Stream | SM (Without FD) | SM (With FD) | SM (FD + non-FD) |
|---|---|---|---|
| Stream 1 (d1) | S1, S2 | S1, S1* | S1, S2 |
| Stream 2 (d2 = 0) | S3, S4 | S2, S2* | S3, S3* |
| Stream 3 (d3 = 0) | | | |
| Stream 4 (d4 = 0) | | | |
| Rate | ½ | 1/4 | 3/8 |

4×2 MIMO-OFDM open loop—two data stream case. In this case, all the options for 4×1 for two data streams may be used.

4×2 MIMO-OFDM—three data stream case. In this case, all the options for 4×1 for three data streams may be used.

4×2 MIMO-OFDM—four data stream case. In this case, all the options for 4×1 for four data streams may be used.

4×3 MIMO-OFDM closed loop—one data stream case.

SM is implemented with SVD beamforming and three spatial streams are available for this case. Three spatial streams that have larger singular values are selected. Without FD, one data symbol is sent per one sub-carrier for each spatial stream, and with FD, one data symbol is sent per two sub-carriers for each spatial stream. Combinations of FD and non-FD are possible as shown in Table 26.

For SFBC, three spatial streams for each sub-carrier are selected, which have larger singular values. Among them, two spatial streams, preferably two bad spatial streams, are assigned for SFBC. Two symbols are sent at the same time by using SFBC on two bad spatial streams of two sub-carriers, and for the best spatial stream of each carrier, one data symbol is sent without SFBC. For the latter spatial stream, without FD, one data symbol is sent per one sub-carrier for each spatial stream, and with FD, one data symbol is sent per two sub-carriers for each spatial stream.

One data stream case for the 4×3 MIMO-OFDM closed loop is summarized in Table 26.

TABLE 26

| Spatial Streams | SM (Without FD) | SM (With FD) | SM (FD + non-FD) | SM (FD + non-FD) | SFBC + non-FD | SFBC + FD |
|---|---|---|---|---|---|---|
| Stream 1 (d1) | S1, S2 | S1, S1* | S1, S2 | S1, S2 | S1, S2 | S1, S1* |
| Stream 2 (d2) | S3, S4 | S2, S2* | S3, S4 | S3, S3* | S3, −S4* | S2, −S3* |
| Stream 3 (d3) | S5, S6 | S3, S3* | S5, S5* | S4, S4* | S4, S3* | S3, S2* |
| Stream 4 (d4 = 0) | | | | | | |
| Rate | 3/4 | 3/8 | 5/8 | 1/2 | 1/2 | 3/8 |

4×3 MIMO-OFDM open loop—one data stream case. In this case, all the options for 4×1 for one data stream case may be used.

4×3 MIMO-OFDM closed loop—two data stream case.

SM is implemented with SVD beamforming and three spatial streams are available for this case. Two data streams are divided into three spatial streams for each sub-carrier. All the SM methods in Table 26 can be applied to this case.

For SFBC, one data stream is sent by using SFBC. Three spatial streams for each sub-carrier are selected, which have larger singular values. Among them, two spatial streams, preferably two bad spatial streams, for each sub-carrier are assigned for SFBC. Two symbols are sent at the same time by using SFBC on two bad spatial streams of two sub-carriers.

The other stream is sent by using SM. All the methods for SFBC in Table 26 can be used for this case.

Two data stream case for the 4×3 MIMO-OFDM closed loop is summarized in Table 27.

TABLE 27

| Spatial Streams | SM (Without FD) | SM (With FD) | SM (FD + non-FD) | SM (FD + non-FD) | SFBC + non-FD | SFBC + FD |
|---|---|---|---|---|---|---|
| Stream 1 (d1) | S1, S2 | S1, S1* | S1, S2 | S1, S2 | S1, S2 | S1, S1* |
| Stream 2 (d2) | S3, S4 | S2, S2* | S3, S4 | S3, S3* | S3, −S4* | S2, −S3* |

TABLE 27-continued

| Spatial Streams | SM (Without FD) | SM (With FD) | SM (FD + non-FD) | SM (FD + non-FD) | SFBC + non-FD | SFBC + FD |
|---|---|---|---|---|---|---|
| Stream 3 (d3) | S5, S6 | S3, S3* | S5, S5* | S4, S4* | S4, S3* | S3, S2* |
| Stream 4 (d4 = 0) | | | | | | |
| Rate | 3/4 | 3/8 | 5/8 | 1/2 | 1/2 | 3/8 |

4×3 MIMO-OFDM open loop—two data stream case. In this case, all the options for 4×1 for two data stream case may be used.

4×3 MIMO-OFDM closed loop—three data stream case.

SM is implemented with SVD beamforming and three spatial streams are available for this case. Three data streams are divided into three spatial streams for each sub-carrier. Without FD, one data symbol is sent per one sub-carrier for each spatial stream, and with FD, one data symbol is sent per two sub-carriers for each spatial stream. Combinations of FD and non-FD are possible.

Three data stream case for the 4×3 MIMO-OFDM closed loop is summarized in Table 28.

TABLE 28

| Spatial Stream | SM (Without FD) | SM (With FD) | SM (FD + non-FD) | SM (FD + non-FD) |
|---|---|---|---|---|
| Stream 1 (d1) | S1, S2 | S1, S1* | S1, S2 | S1, S2 |
| Stream 2 (d2) | S3, S4 | S2, S2* | S3, S4 | S3, S3* |
| Stream 3 (d3) | S5, S6 | S3, S3* | S5, S5* | S4, S4* |
| Stream 4 (d4 = 0) | | | | |
| Rate | 3/4 | 3/8 | 5/8 | 1/2 |

4×3 MIMO-OFDM open loop—three data stream case. In this case, all the options for 4×1 for three data stream case may be used.

4×3 MIMO-OFDM closed loop—four data stream case. In this case, all the options for 4×1 for four data stream case may be used.

4×4 MIMO-OFDM closed loop—one data stream case.

SM is implemented with SVD beamforming and four spatial streams are available for this case. Without FD, one data symbol is sent per one sub-carrier for each spatial stream, and with FD, one data symbol is sent per two sub-carriers for each spatial stream. Combinations of FD and non-FD are possible as shown in Table 29.

A first option for SFBC is using one 2×2 SFBC and two SMs. By singular values of each sub-carrier, two spatial streams, preferably two bad spatial streams having smaller singular values, are selected. On these two bad spatial streams of each sub-carrier, the data symbol is sent by using SFBC. By using the other two good spatial streams of each sub-carrier two data symbols are sent by using SM, without SFBC. In this case, without FD, one data symbol is sent per one sub-carrier for each spatial stream, and with FD, one data symbol is sent per two sub-carriers for each spatial stream. A combination of FD and non-FD is possible as shown in Table 30.

A second option is using two 2×2 SFBCs. Each two data symbols are assigned to the separate 2×2 SFBC. Four spatial streams of each sub-carrier are divided into two groups of two spatial streams and each group is assigned to each SFBC. For each instant, four (4) data symbols of the data stream on two sub-carriers are sent by using the SVD beamforming and two 2×2 SFBCs.

One data stream case for the 4×4 MIMO-OFDM closed loop for SM is summarized in Table 29 and one data stream case for the 4×4 MIMO-OFDM closed loop for SFBC is summarized in Table 30.

TABLE 29

| Spatial Stream | SM (Without FD) | SM (With FD) | SM (FD + non-FD (case 1) | SM (FD + non-FD (case 2) | SM (FD + non-FD (case 3) |
|---|---|---|---|---|---|
| Stream 1 (d1) | S1, S2 | S1, S1* | S1, S2 | S1, S2 | S1, S2 |
| Stream 2 (d2) | S3, S4 | S2, S2* | S3, S3* | S3, S4 | S3, S4 |
| Stream 3 (d3) | S5, S6 | S3, S3* | S4, S4* | S5, S5* | S5, S6 |
| Stream 4 (d4) | S7, S8 | S4, S4* | S5, S5* | S6, S6* | S7, S7* |
| Rate | 1 | 1/2 | 5/8 | 3/4 | 7/8 |

TABLE 30

| Spatial Streams | SFBC (Without FD) | SFBC (With FD) | SFBC (FD + non-FD) | TWO SFBC |
|---|---|---|---|---|
| Stream 1 (d1) | S1, S2 | S1, S1* | S1, S2 | S1, −S2* |
| Stream 2 (d2) | S3, S4 | S2, S2* | S3, S3* | S2, S1* |
| Stream 3 (d3) | S5, −S6* | S3, −S4* | S4, −S5* | S3, −S4* |
| Stream 4 (d4) | S6, S5* | S4, S3* | S5, S4* | S4, S3* |
| Rate | 3/4 | 1/2 | 5/8 | 1/2 |

4×4 MIMO-OFDM open loop—one data stream case. In this case, all the options for 4×1 for one data stream case may be used.

4×4 MIMO-OFDM closed loop—two data stream case.

SM is implemented with SVD beamforming and four spatial streams are available for this case. Two data streams are divided into four spatial streams for each sub-carrier. All the methods in Tables 29 and 30 can be used.

4×4 MIMO-OFDM open loop—two data stream case. In this case, all the options for 4×1 for two data stream case may be used.

4×4 MIMO-OFDM closed loop—three data stream case.

SM is implemented with SVD beamforming and four spatial streams are available for this case. Three data streams are divided into four spatial streams for each sub-carrier. All the methods in Table 29 can be used.

For SFBC, one 2×2 SFBC and two SMs are used for three data streams. One data stream is sent by using the 2×2 SFBC with SVD beamforming. By singular values of each sub-carrier, two spatial streams, preferably two bad spatial streams having smaller singular values, are selected. On these two bad spatial streams of each sub-carrier, two data symbols of one data stream on two sub-carriers are sent by using SFBC and SVD beamforming. The other two data streams are sent by using SM with SVD beamforming. Using the other two good spatial streams of each sub-carrier, two data symbols per sub-carrier are sent for the other two data streams by using SM, without SFBC. In this case, without FD, one data symbol is sent per one sub-carrier for each spatial stream, and with FD, one data symbol is sent per two sub-carriers for each spatial stream. A combination of FD and non-FD is possible as shown in Table 31.

Three data stream case for the 4×4 MIMO-OFDM closed loop for SFBC is summarized in Table 31.

TABLE 31

| Spatial Stream | SFBC (Without FD) | SFBC (With FD) | SFBC (FD + non-FD) |
|---|---|---|---|
| Stream 1 (d1) | S1, S2 | S1, S1* | S1, S2 |
| Stream 2 (d2) | S3, S4 | S2, S2* | S3, S3* |
| Stream 3 (d3) | S5, −S6* | S3, −S4* | S4, −S5* |
| Stream 4 (d4) | S6, S5* | S4, S3* | S5, S4* |
| Rate | 3/4 | 1/2 | 5/8 |

4×4 MIMO-OFDM open loop—three data stream case. In this case, all the options for 4×1 for three data stream case may be used.

4×4 MIMO-OFDM closed loop—four data stream case. SM is implemented with SVD beamforming and four spatial streams are available for this case. Four data streams are divided into four spatial streams for each sub-carrier. All the methods in Table 29 can be used.

4×4 MIMO-OFDM open loop—four data stream case. In this case, all the options for 4×1 for four data stream case may be used.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A device for transmitting and receiving comprising:
   a receiver configured to receive channel state information (CSI), wherein the CSI includes a first channel quality indicator (CQI) for a first group of subcarriers and a second CQI for a second group of subcarriers;
   circuitry configured to determine for the first group of subcarriers a first number of streams for spatial multiplexing and, based on the first CQI, a first modulation and coding scheme and to determine for the second group of subcarriers a second number of streams and, based on the second CQI, a second modulation and coding scheme, wherein the first number of streams and the second number of streams are different;
   a transmitter configured to transmit first data symbols using the first group of subcarriers and the first number of streams; and
   the transmitter further configured to transmit second data symbols using space frequency block coding (SFBC), wherein a pair of the second data symbols are SFBC coded to be transmitted on only two of four antennas.

2. The device of claim 1, wherein the transmitter is further configured to transmit data symbols using multiple input multiple output (MIMO).

3. A wireless transmit/receive unit comprising:
   a transmitter configured to transmit channel state information (CSI), wherein the CSI includes a first channel quality indicator (CQI) for a first group of subcarriers and a second CQI for a second group of subcarriers;
   a receiver configured to receive, for the first group of subcarriers, first data symbols over a first number of streams transmitted with spatial multiplexing and, based on the first CQI, transmitted using a first modulation and coding scheme for the first group of subcarriers;
   the receiver configured to receive, for the second group of subcarriers, second data symbols over a second number of streams transmitted with spatial multiplexing and, based on the second CQI, transmitted using a second modulation and coding scheme for the second group of subcarriers, wherein the first number of streams and the second number of streams are different; and
   the receiver further configured to receive third data symbols, wherein the third data symbols were transmitted using space frequency block coding (SFBC) and a pair of the third data symbols were SFBC coded to be transmitted on only two of four antennas.

4. The wireless transmit/receive unit of claim 3, wherein the receiver is further configured to receive data symbols using multiple input multiple output (MIMO).

5. A method for transmitting and receiving, the method comprising:
   receiving channel state information (CSI), wherein the CSI includes a first channel quality indicator (CQI) for a first group of subcarriers and a second CQI for a second group of subcarriers;
   determining, for the first group of subcarriers, a first number of streams for spatial multiplexing and, based on the first CQI, a first modulation and coding scheme;
   determining, for the second group of subcarriers, a second number of streams and, based on the second CQI, a second modulation and coding scheme, wherein the first number of streams and the second number of streams are different;
   transmitting first data symbols using the first group of subcarriers and the first number of streams; and
   transmitting second data symbols using space frequency block coding (SFBC), wherein a pair of the second data symbols are SFBC coded to be transmitted on only two of four antennas.

6. The method of claim 5 wherein data symbols are received using multiple input multiple output (MIMO).

* * * * *

UNITED STATES PATENT AND TRADEMARK OFFICE
CERTIFICATE OF CORRECTION

PATENT NO. : 10,135,574 B2
APPLICATION NO. : 15/401924
DATED : November 20, 2018
INVENTOR(S) : Jaeyojng Kwak et al.

It is certified that error appears in the above-identified patent and that said Letters Patent is hereby corrected as shown below:

In the Specification

At Column 10, in Table 11 after Line 56, after each of the two instances of the word "non-FD", insert --)--.
At Column 11, in Table 12, Line 18, after each of the two instances of the word "non-FD", insert --)--.
At Column 12, Line 21, before the word "same", insert --the--.
At Column 12, Line 21, after the word "same", delete "to" and insert --as--.
At Column 12, Line 25, after the word "is", insert --the--.
At Column 12, Line 26, after the word "same", delete "to" and insert --as--.
At Column 14, Line 54, after the word "not" and before the word "used", insert --be--.
At Column 15, Line 34, after the word "not" and before the word "used", insert --be--.
At Column 15, Line 47, after the word "not" and before the word "used", insert --be--.
At Column 15, in Table 20, at Line 15, after the word "non-FD", insert --)--.
At Column 16, in Table 22, at Line 4, after the word "non-FD", insert --)--.
At Column 16, in Table 23, at Line 15, after the word "non-FD", insert --)--.
At Column 16, Line 64, after the word "data", delete "symbol" and insert --symbols--.
At Column 16, Line 65, after the word "each", delete "instant" and insert --instances--.
At Column 19, Line 67, after the word "each", delete "instant" and insert --instance--.
At Column 20, in Table 29 at Line 21, after each of the three instances of the word "non-FD", insert --)--.
At Column 21, in Table 31 at Line 11, after the word "non-FD", insert --)--.

Signed and Sealed this
Twenty-third Day of June, 2020

Andrei Iancu
*Director of the United States Patent and Trademark Office*